United States Patent
Hecht (10) Patent No.: US 9,573,204 B2
(45) Date of Patent: Feb. 21, 2017

(54) CUTTING TOOL HAVING AN ANTI-SLIP ARRANGEMENT

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 130 days.

(21) Appl. No.: 14/398,888

(22) PCT Filed: Jun. 3, 2013

(86) PCT No.: PCT/IL2013/050473
§ 371 (c)(1),
(2) Date: Nov. 4, 2014

(87) PCT Pub. No.: WO2013/183045
PCT Pub. Date: Dec. 12, 2013

(65) Prior Publication Data
US 2015/0125225 A1    May 7, 2015

(51) Int. Cl.
*B23C 5/22* (2006.01)
*B23C 5/24* (2006.01)

(52) U.S. Cl.
CPC .......... *B23C 5/2269* (2013.01); *B23C 5/2221* (2013.01); *B23B 2200/161* (2013.01);
(Continued)

(58) Field of Classification Search
CPC ................. B23B 2200/161; B23C 2200/161; B23C 2210/168; B23C 2270/08; B23C 5/2221; B23C 5/2269; B23C 5/2468; B23C 5/2465; Y10T 407/1932; Y10T 407/1936; Y10T 407/1938; Y10T 407/22; Y10T 407/227; Y10T 407/2274; Y10T 407/23; Y10T 407/228; Y10T 407/192; Y10T 407/1934; Y10T 407/1906

See application file for complete search history.

(56) References Cited

U.S. PATENT DOCUMENTS 4,335,983 A      6/1982   Wermeister et al.
5,167,473 A  *  12/1992   Barnett ............... B23B 27/1662
                                                             407/104
(Continued)

FOREIGN PATENT DOCUMENTS

DE          4334852 A1  *  4/1995   ............... B23C 5/22
JP          11019808 A   *  1/1999
SE     WO 9830349 A1  *  7/1998   ........... B23B 27/065

OTHER PUBLICATIONS

International Search Report in PCT/IL2013/050473, dated Oct. 22, 2013.
(Continued)

*Primary Examiner* — Daniel Howell
*Assistant Examiner* — Nicole N Ramos
(74) *Attorney, Agent, or Firm* — Womble Carlyle (57) ABSTRACT

A cutting tool and a cutting insert, each of which including a base surface and an anti-slip arrangement adjacent thereto. Each anti-slip arrangement includes an actuator surface and non-parallel first and second abutment surfaces, and the actuator surface of the cutting tool is a surface of a clamp of the cutting tool. The cutting insert is mounted on the cutting tool via engagement of the base surfaces thereof and the clamp is operable to bias the actuator surfaces against each other and thereby force the first and second abutment surfaces against each other, for preventing slippage of the cutting insert along the tool's base surface.

23 Claims, 6 Drawing Sheets

(52) U.S. Cl.
CPC .......... *B23C 5/2465* (2013.01); *B23C 5/2468* (2013.01); *B23C 2200/161* (2013.01); *B23C 2210/168* (2013.01); *B23C 2270/08* (2013.01); *Y10T 407/192* (2015.01); *Y10T 407/1906* (2015.01); *Y10T 407/1934* (2015.01); *Y10T 407/22* (2015.01); *Y10T 407/228* (2015.01); *Y10T 407/23* (2015.01)

(56) References Cited

U.S. PATENT DOCUMENTS

| | | | | |
|---|---|---|---|---|
| 5,536,119 | A * | 7/1996 | Werner | B23B 27/1622 407/113 |
| 6,168,356 | B1 * | 1/2001 | Sjoo | B23B 27/065 407/104 |
| 6,343,898 | B1 | 2/2002 | Sjööo et al. | |
| 6,536,996 | B2 | 3/2003 | Satran et al. | |
| 6,619,892 | B2 | 9/2003 | Enquist | |
| 6,769,843 | B2 * | 8/2004 | Hansson | B23B 27/00 407/104 |
| 7,121,771 | B2 | 10/2006 | Englund | |
| 7,566,192 | B2 * | 7/2009 | Waggle | B23C 5/2208 407/35 |
| 7,597,507 | B2 * | 10/2009 | Sakamoto | B23C 5/109 407/113 |
| 2007/0122242 | A1 | 5/2007 | Englund et al. | |
| 2008/0166191 | A1 | 7/2008 | Andersson et al. | |

OTHER PUBLICATIONS

Written Opinion in PCT/IL2013/050473, dated Oct. 22, 2013.
Chinese Office Action with Search Report dated Feb. 19, 2016, issued in CN counterpart application (No. 201380029723.8).

* cited by examiner

CUTTING TOOL HAVING AN ANTI-SLIP ARRANGEMENT

RELATED APPLICATIONS

This is a 371 US National Phase of International Patent Application No. PCT/IL2013/050473, filed 2013 Jun. 3, and published as WO2013/183045A1 on 2013 Dec. 12. Priority is claimed via PCT/IL2013/050473 to U.S. patent application Ser. No. 13/490,197, filed 2012 Jun. 6. The contents of the aforementioned applications are incorporated by reference in their entirety.

FIELD OF THE INVENTION

The subject matter of the present application relates to cutting inserts and tools for holding same, in particular cutting inserts and tools for machining workpieces. More specifically, the application relates to a cutting insert and tool formed with non-parallel abutment surfaces adjacent to base surfaces thereof.

BACKGROUND OF THE INVENTION

Precise positioning of a cutting insert on a tool can allow for high precision cutting. However, cutting inserts are often subjected to high forces during cutting operations which can cause displacement or change of orientation of the cutting insert on a tool which holds them.

Maintaining a desired position may be assisted by biasing the cutting insert in a cutting direction. One such example is disclosed in U.S. Pat. No. 4,335,983. Notably, the side surfaces of the cutting insert constitute the abutment surfaces thereof.

By contrast, U.S. Pat. No. 6,536,996 discloses a cutting insert formed with non-parallel abutment surfaces adjacent to an insert base surface thereof.

It is an object of the present application to provide a new and improved anti-slip arrangement for maintaining a cutting insert position in a tool during a cutting operation.

SUMMARY OF THE INVENTION

The subject matter of the present application relates to, inter alia, an anti-slip arrangement for maintaining a precise mounted operative position of a cutting insert in a tool. More precisely, the anti-slip arrangement can be formed with non-parallel abutment surfaces adjacent to base surfaces of the cutting insert and the tool.

Numerous advantages can be realized with an anti-slip arrangement formed adjacent a base surface of a cutting insert. For example, as the upper portion of the cutting insert can be independent of the anti-slip arrangement, there is no restriction as to the design thereof. To elaborate, a single tool with a corresponding anti-slip arrangement could hold cutting inserts with very different upper portions (indexable or non-indexable, different shaped e.g. circular, rhombic etc., different sized).

Accordingly, in accordance with a first aspect of the subject matter of the present application, there is provided a tool assembly or method for biasing a cutting insert anti-slip arrangement formed adjacent to an insert base surface.

Such arrangement, in particular when non-parallel abutment surfaces are closer to a tool peripheral region than a tool inner region, may be particularly beneficial for rotating tools and in particular high-speed rotating tools, which are subjected to high cutting forces. High-speed tools can be defined as those which are configured for operation in which a friction lock is insufficient to withstand centrifugal forces during rotation. Further elaboration can be found in ISO 15641. Such tools may be particularly advantageous for machining materials such as soft metals, especially aluminium.

Such arrangement could also be particularly beneficial for lateral cutting operations (including, for example, ramp-down operations), even at lower speeds, in which cutting inserts can tend to be subjected to high displacement forces.

In accordance with an aspect of the subject matter of the present application, there is provided a method of clamping a cutting insert to a tool or, stated differently, securing a cutting insert against slippage in an operative position on a tool.

The method comprises mounting the cutting insert on the tool in a position in which an insert base surface contacts a tool base surface, and biasing a clamp's tool actuator surface against an insert actuator surface to thereby force non-parallel first and second insert abutment surfaces respectively against non-parallel first and second tool abutment surfaces.

Abutment of the base surfaces and abutment surfaces can be configured to prevent slippage of the cutting insert along the tool base surface.

For the purposes of the specification and claims, slippage of the cutting insert along the tool base surface can include rotational and/or translational motion. In preferred embodiments the slippage could be visible slippage, i.e. there could be sufficient constructional tolerance of the tool and/or cutting insert to allow visible relative motion thereof, which could allow the clamp to suitably position the cutting insert. However, the slippage could also be non-visible slippage, i.e. extremely small, such that it is not visible without magnification, but which can occur during cutting operations.

More precisely, the method can comprise: the tool comprising an insert seating region comprising a tool base surface, tool inner and peripheral regions located on opposing sides of the insert seating region, and a tool anti-slip arrangement; the tool anti-slip arrangement comprising first and second tool abutment surfaces formed adjacent to the tool base surface and being non-parallel to each other and to the tool base surface, and a clamp located at the tool inner region and comprising a tool actuator surface which is oriented transverse to the tool base surface; the cutting insert comprising opposing insert top and base surfaces which are connected by an insert peripheral surface, at least one cutting edge, and an insert anti-slip arrangement formed adjacent to the insert base surface; the insert anti-slip arrangement comprising first and second insert abutment surfaces which are non-parallel to each other and to the insert base surface, and an insert actuator surface which is oriented transverse to the insert base surface; wherein the method comprises:

a. mounting the cutting insert on the tool in a position in which the insert base surface contacts the tool base surface; and b. biasing the clamp's tool actuator surface against the insert actuator surface, thereby biasing the first and second insert abutment surfaces respectively against the first and second tool abutment surfaces for preventing slippage of the cutting insert along the tool base surface.

In accordance with yet another aspect of the subject matter of the present application there is provided a tool assembly or method of using same, the tool assembly comprising a clamp configured for biasing an insert actuator surface of a cutting insert, the insert actuator surface being formed adjacent to an insert base surface of the cutting insert. More precisely, the insert actuator surface can be located on a protuberance extending from the insert base surface in a direction away from an insert top surface.

In accordance with another aspect of the subject matter of the present application, there is provided a tool assembly. The tool assembly can be configured for application of the methods detailed in the first aspect. The cutting insert and the tool can be configured such that the insert base surface contacts the tool base surface and the clamp is configured to bias the tool actuator surface against the insert actuator surface. Such biasing can consequently bias the first and second insert abutment surfaces against the first and second tool abutment surfaces. This arrangement can prevent slippage of the cutting insert along the tool base surface.

More precisely, the tool assembly can comprise in combination a tool configured for cutting in a cutting direction and a cutting insert mounted to the tool: the tool comprising an insert seating region comprising a tool base surface, tool inner and peripheral regions located on opposing sides of the insert seating region, the cutting direction being defined as extending from the tool inner region towards the tool peripheral region, and a tool anti-slip arrangement; the tool anti-slip arrangement comprising first and second tool abutment surfaces formed adjacent to the tool base surface and being non-parallel to each other and to the tool base surface, and a clamp located at the tool inner region and comprising a tool actuator surface which is oriented transverse to the tool base surface; the cutting insert comprising opposing insert top and base surfaces which are connected by an insert peripheral surface, at least one cutting edge, and an insert anti-slip arrangement formed adjacent to the insert base surface; the insert anti-slip arrangement comprising first and second insert abutment surfaces which are non-parallel to each other and to the insert base surface, and an insert actuator surface which is oriented transverse to the insert base surface; wherein: the cutting insert and the tool are configured for a position in which the insert base surface contacts the tool base surface; and the clamp is configured to bias the tool actuator surface against the insert actuator surface which consequently biases the first and second insert abutment surfaces against the first and second tool abutment surfaces for preventing slippage of the cutting insert along the tool base surface.

In accordance with still another aspect of the subject matter of the present application, there is provided a cutting insert comprising first and second insert abutment surfaces which are non-parallel to each other and an insert actuator surface, which are together configured for positioning of the insert in a tool. The cutting insert can be configured for use in the tool assembly or in application of the methods detailed in the previous aspects. The first and second insert abutment surfaces and the insert actuator surface can be, in a bottom view of the cutting insert, in a triangular configuration. The first and second insert abutment surfaces can partially or along the entire length thereof, converge towards each other.

More precisely, the cutting insert can comprise opposing insert top and base surfaces which are connected by an insert peripheral surface, at least one cutting edge, and an insert anti-slip arrangement formed adjacent to the insert base surface; the insert anti-slip arrangement comprising first and second insert abutment surfaces which are non-parallel to each other and to the insert base surface, and an insert actuator surface having a blunt shape and lying in an insert actuator surface plane which is oriented transverse to the insert base surface; wherein pairs of closest points of the first and second insert abutment surfaces lie within respective common insert abutment surface planes which are parallel to the insert actuator surface plane, are a predetermined distance apart; and at least one of the predetermined distances has a greater magnitude than another predetermined distance which is associated with a pair of points further spaced from the insert actuator surface plane.

In accordance with a further aspect of the subject matter of the present application, there is provided a cutting insert comprising opposing insert top and base surfaces which are connected by an insert peripheral surface, opposing first and second cutting ends arranged along an insert longitudinal plane perpendicular to the insert top and base surfaces, a protuberance surrounded by the insert base surface and spaced apart from the insert peripheral surface, and first and second insert anti-slip arrangements formed on the protuberance, each insert anti-slip arrangement comprising: outwardly facing first and second insert abutment surfaces which are non-parallel to the insert base surface, and an outwardly facing insert actuator surface oriented transverse to the insert base surface, wherein: the first and second insert abutment surfaces of one insert anti-slip arrangement converge in a direction towards the insert actuator surface of the other anti-slip arrangement and also towards an associated cutting end.

In accordance with another aspect of the subject matter of the present application, there is provided a tool comprising first and second tool abutment surfaces which are non-parallel to each other and a tool actuator surface, which are configured for positioning of an insert in a tool. The tool can be configured for use in the tool assembly or application of the methods detailed in the previous aspects. The first and second tool abutment surfaces and the tool actuator surface can be, in a plan view thereof, in a triangular configuration. The first and second tool abutment surfaces can partially or along the entire length thereof, converge towards each other.

More precisely, the tool can have a cutting direction and can comprise an insert seating region comprising a tool base surface, tool inner and peripheral regions located on opposing sides of the insert seating region, the cutting direction being defined as extending from the tool inner region towards the tool peripheral region, and a tool anti-slip arrangement; the tool anti-slip arrangement comprising first and second tool abutment surfaces formed adjacent to the tool base surface and being non-parallel to each other and to the tool base surface, and a clamp located at the tool inner region and comprising a tool actuator surface lying in a tool actuator surface plane which is oriented transverse to the tool base surface; wherein pairs of closest points of the first and second tool abutment surfaces lie within respective common tool abutment surface planes which are parallel to the tool actuator surface plane, are a predetermined distance apart; at least one of the predetermined distances has a greater magnitude than another predetermined distance which is associated with a pair of points further spaced from the tool actuator surface plane; and the clamp is configured for force application in the cutting direction via the tool actuator surface.

In summary, the cutting insert or tool of the aspects above can comprise a base surface and an anti-slip arrangement formed adjacent thereto. Each anti-slip arrangement can comprise an actuator surface and first and second abutment surfaces. The anti-slip arrangement of the tool can comprise a clamp, which in turn comprises the tool actuator surface. The cutting insert can be mounted on the cutting tool via engagement of the base surfaces thereof and the clamp can be operated to bias the actuator surfaces and first and second abutment surfaces against each other for preventing slippage of the cutting insert along the tool's base surface.

It is understood that the above-said is a summary, and that any of the aspects above may further comprise any of the features described hereinbelow. Specifically, the following features, either alone or in combination, may be applicable to any of the above aspects:

i. Biasing of the tool actuator surface can be in the cutting direction. The cutting direction can be defined as extending from the tool inner region towards the tool peripheral region. For cutting inserts with a major cutting edge, the cutting direction can be further defined as directed towards the major cutting edge. Biasing of the tool actuator surface can comprise moving the clamp in a plane parallel to the tool base surface.

ii. Biasing of the tool actuator surface can comprise moving at least a portion of the clamp in a motion direction transverse to the cutting direction. Moving the clamp can comprise moving the entire clamp in a motion direction transverse to the cutting direction.

iii. An internal direction angle formed between the cutting direction and the motion direction can be an acute angle. Preferably, the direction angle can be between 30° and 80°.

iv. The cutting insert's at least one cutting edge can be formed at an intersection of the insert top surface and the insert peripheral surface.

v. At least a portion of the insert top surface can be configured as a rake surface and at least a portion of the insert peripheral surface adjacent to the rake surface can be configured as a relief surface.

vi. The cutting insert can comprise a through hole opening out to the top insert surface and another surface of the cutting insert. In a bottom view of the cutting insert, the insert actuator surface can be located on one side of the through hole and the first and second insert abutment surfaces can be located on an opposing side of the through hole.

vii. In a bottom view of the cutting insert, each of the first and second insert abutment surfaces and the insert actuator surface can face outward from the insert.

viii. Each pair of points of the first and second insert abutment surfaces which are closer to the insert actuator surface plane than another pair of points of the first and second insert abutment surfaces located further from the insert actuator surface plane, can have a predetermined distance of greater magnitude than the latter pair of points.

ix. In a bottom view of the cutting insert, the first and second insert abutment surfaces can extend at a cutting insert abutment angle of less than 180° to each other. In a bottom view of the cutting insert, the first and second insert abutment surfaces can extend at an acute insert abutment angle to each other. Even more precisely, a range of 20° to 90° is believed to be feasible with most insert types. Even more precisely, for the type of insert shown, a range of about 40° to about 45° is most preferred.

x. In a bottom view of the cutting insert, the first and/or second insert abutment surfaces extend in a straight line.

xi. In a bottom view of the cutting insert, the first insert abutment surface can be longer than the second insert abutment surface.

xii. In a plan view of an insert base surface, an insert anti-slip arrangement can be visible.

xiii. In a plan view of a tool base surface, a tool anti-slip arrangement can be visible.

xiv. The first and second insert abutment surfaces can be distinct from an insert peripheral surface. The first and second insert abutment surfaces can be spaced apart from an intersection of the insert peripheral surface and the insert base surface.

xv. The insert actuator surface can be distinct from the insert peripheral surface. The insert actuator surface can be spaced apart from an intersection of the insert peripheral surface and the insert base surface.

xvi. The first and second insert abutment surfaces can be formed adjacent to the insert base surface.

xvii. The first and second insert abutment surfaces can be, in a plan view of the insert base surface, non-parallel to each other and to the insert base surface xviii. The first and second insert abutment surfaces and the insert actuator surface can be, in a plan view of the insert base surface, in a triangular configuration.

xix. The first and second tool abutment surfaces can be formed adjacent to the tool base surface.

xx. The first and second tool abutment surfaces can be, in a plan view of the tool base surface, non-parallel to each other and to the tool base surface xxi. The first and second tool abutment surfaces and the tool actuator surface can be, in a plan view of the tool base surface, in a triangular configuration.

xxii. The first and second insert abutment surfaces and the insert actuator surface can extend in a direction away from the insert top surface.

xxiii. The insert actuator surface and/or the first and second insert abutment surfaces of the cutting insert can be perpendicular to the insert base surface or at least partially slanted in a downward-outward direction. Such construction can be beneficial in prevention of a tool actuator surface propelling the cutting insert in a direction away from the tool base surface.

xxiv. The first and second insert abutment surfaces can be formed on a single protuberance. The insert actuator surface and the first and second insert abutment surfaces can be formed on a single protuberance. Every insert actuator surface and the first and second insert abutment surfaces of the cutting insert can be formed on a single protuberance. Every insert actuator surface and the first and second insert abutment surfaces of the cutting insert can be connected to form a periphery of, or enclose, a single protuberance.

xxv. The bluntness of the insert actuator surface can be for providing a consistent or controlled force application direction. The insert actuator surface can have a curvature which does not extend along, or is free of, portions which are tangential to surfaces connected to the insert actuator surface. The insert actuator surface can be convexly curved. The insert actuator surface can have a curvature which is only apparent in a magnified view (i.e. to the naked eye the insert actuator surface appears flat, yet using any magnification means, a magnifying glass, etc., curvature is viewable).

xxvi. In a bottom view of the cutting insert, the insert actuator surface can follow a straight line. The blunt shape of the insert actuator surface can be flat.

xxvii. The cutting insert can comprise an insert cutting plane which extends perpendicular to the insert base surface and an insert longitudinal plane, the insert longitudinal plane extending longitudinally through the cutting insert and perpendicular to the insert base surface. In a bottom view of the cutting insert, the insert cutting plane can theoretically divide the cutting insert into imaginary first and second insert halves. In a bottom view of the cutting insert, the first and second insert abutment surfaces can be at least partially located at the first insert half and the insert actuator surface can be located at the second insert half. At least a majority of the first insert abutment surface and/or the second insert abutment surfaces can be located at the first insert half. An entirety of the second insert abutment surface can be located at the first insert half. An entirety of each of the first and second insert abutment surfaces can be located at the first insert half. An entirety of the second insert abutment surface and only a portion of the first insert abutment surface can be located at the first insert half. The portion in the first half can be a majority of the first insert abutment surface.

xxviii. In a bottom view of the cutting insert, closest portions of the first and second insert abutments surfaces can be closer to the cutting edge than to the insert cutting plane.

xxix. In a bottom view of the cutting insert, the insert anti-slip arrangement, or each insert anti-slip arrangement, can be asymmetric about an insert longitudinal plane.

xxx. The insert base surface can extend along the entire insert peripheral surface.

xxxi. A first insert base width of the insert base surface which extends from, and perpendicular to, the first insert abutment surface (of each anti-slip arrangement), can be greater than a second insert base width which extends from, and perpendicular to, the second insert abutment surface (of each anti-slip arrangement).

xxxii. The insert base surface can be flat.

xxxiii. The cutting insert can be indexable. The cutting insert can comprise an additional, i.e. a second, insert anti-slip arrangement. Such construction could be for a different indexed position. The additional insert anti-slip arrangement can have any feature of the first anti-slip arrangement. The additional insert anti-slip arrangement can have the same features as the first anti-slip arrangement. Each insert actuator surface of one of the insert anti-slip arrangements can connect the first and second insert abutments surfaces of the other insert anti-slip arrangement.

xxxiv. The cutting insert can have 180° rotational symmetry around an insert central axis extending perpendicular to, and through the center of, the insert base surface.

xxxv. The clamp's force application can be in a direction parallel to the tool base surface.

xxxvi. The tool actuator surface can extend perpendicular to the tool base surface.

xxxvii. The clamp and/or tool can be configured for linear motion of the clamp. The linear motion of the clamp can be in a plane parallel to the tool base surface. The linear motion of the clamp is in a direction transverse to the cutting direction. The tool can be formed with a track. The track can be a linear track within which the clamp is permitted linear motion. The track can be bounded by an inner wall of the tool. The track and the clamp can be configured for continuous contact of the inner wall and clamp at each position thereof.

xxxviii. The clamp can have a clamp wall surface which forms an internal acute clamp angle α with the tool actuator surface. The clamp angle α can fulfill the condition $30° < α < 80°$.

xxxix. In a clamped position, the clamp can have a clamp wall surface which contacts an inner wall of the tool.

xl. A slanted clamp surface can be formed on an upwardly projecting clamp projection.

xli. A clamp can be substantially planar shaped, except for an upwardly projecting clamp projection thereof.

xlii. A tool actuator surface 30 can be formed at an end of an elongated and plate-shaped clamp protrusion.

xliii. In a plan view of the tool, each of the first and second insert abutment surfaces and the insert actuator surface can face inwardly.

xliv. Each pair of points of the first and second tool abutment surfaces which are closer to the tool actuator surface plane than another pair of points, can have a predetermined distance of greater magnitude than the latter pair of points. In a plan view of the insert seating region, the first and second tool abutment surfaces can extend at an angle of less than 180° to each other. In a plan view of the insert seating region, the first and/or second tool abutment surfaces can extend in a straight line.

xlv. In a plan view of the insert seating region, the first and second tool abutment surfaces extend at an acute angle to each other. Even more precisely, a range of 20° to 90° is believed to be feasible with most insert types. Even more precisely, for the type of insert shown, a range of about 40° to about 45° is most preferred.

xlvi. In a plan view of the insert seating region, the first tool abutment surface can be longer than the second tool abutment surface.

xlvii. The first and second tool abutment surfaces and the tool actuator surface can be recessed into the insert seating region.

xlviii. The tool actuator surface and/or the first and second tool abutment surfaces of the tool can be perpendicular to the tool base surface or at least partially slanted in an upward-inward direction.

xlix. The first and second tool abutment surfaces can be formed in a single tool recess.

l. The tool actuator surface and the first and second tool abutment surfaces can be portions of a single continuous shape.

li. The tool actuator surface can have a blunt shape. The bluntness of the tool actuator surface can be for providing a consistent or controlled force application direction. The tool actuator surface can have a curvature which does not extend along, or is free of, portions which are tangential to surfaces connected thereto. The tool actuator surface can be convexly curved. The tool actuator surface can have a curvature which is only apparent in a magnified view.

lii. In a plan view of the insert seating region, the tool actuator surface can follow a straight line. The blunt shape of the tool actuator surface can be flat.

liii. The tool base surface can extend along the entire insert seating region except for a portion completed by the clamp.

liv. A first tool base width of the tool base surface which extends from, and perpendicular to, the first tool abutment surface, can be greater than a second tool base width which extends from, and perpendicular to, the second tool abutment surface.

lv. The tool base surface can be flat.

lvi. The tool anti-slip arrangement and the insert anti-slip arrangement can be configured to prevent motion of the cutting insert in a plane parallel with the tool base surface.

lvii. The tool anti-slip arrangement and the insert anti-slip arrangement can be configured to prevent motion of the cutting insert only in a plane parallel with the tool base surface.

lviii. The tool can be additionally configured to apply a clamping force or otherwise prevent disengagement of the cutting insert's base surface from the tool base surface.

For example, the tool can comprise a biasing arrangement configured to bias the insert base surface against the tool base surface.

lix. The biasing arrangement can be configured to allow slippage of the cutting insert along the tool base surface. The slippage allowed can be visible slippage.

lx. The cutting insert and/or the tool can be configured so that the only surfaces of the tool which contact a periphery of the cutting insert are the tool actuator surface and the first and second tool abutment surfaces.

lxi. The cutting insert and/or the tool can be configured so that the only surfaces of the tool which contact the cutting insert are the tool actuator surface, the tool base surface and the first and second tool abutment surfaces.

lxii. The tool actuator surface and the insert actuator surface can be both blunt. Preferably, exactly one of the two actuator surfaces can be flat. The most preferable configuration can be with the insert actuator surface being flat.

lxiii. The first and second tool abutment surfaces can be integrally formed with the tool.

lxiv. The tool base surface can connect the first and second tool abutment surfaces. Stated differently, the tool can provide a continuous wall from the first abutment surface to the second abutments surface.

lxv. The first and second insert abutment surfaces can be integrally formed with the cutting insert.

lxvi. The insert seating region can be formed with an insert pocket comprising at least two walls.

lxvii. Clamping of the cutting insert to the tool can comprise sliding motion of the cutting insert's insert base surface along the tool base surface.

lxviii. The insert anti-slip arrangement can be spaced apart from or separate from the insert peripheral surface.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Referring to FIGS. 1A to 1D, which illustrate an example tool assembly 10 comprising a tool 12 and at least one cutting insert 14 clamped thereto. The tool 12 exemplified is a milling tool-head.

Figures 1A, 1B:
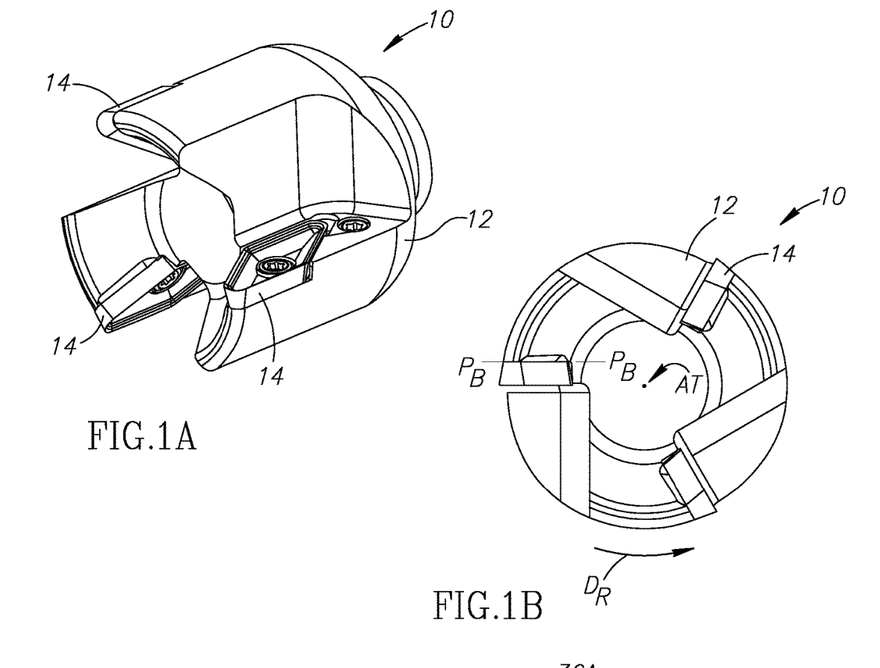
FIG. 1A is a perspective view of a tool assembly.
FIG. 1B is a plan view of the tool assembly in FIG. 1A.

The tool assembly 10, in this non-limiting example, is configured to mill a workpiece (not shown) by rotating about a tool axis $A_T$ in a rotation direction $D_R$, which in this non-limiting example can be, in the view shown in FIG. 1B, counterclockwise.

Figure 2:
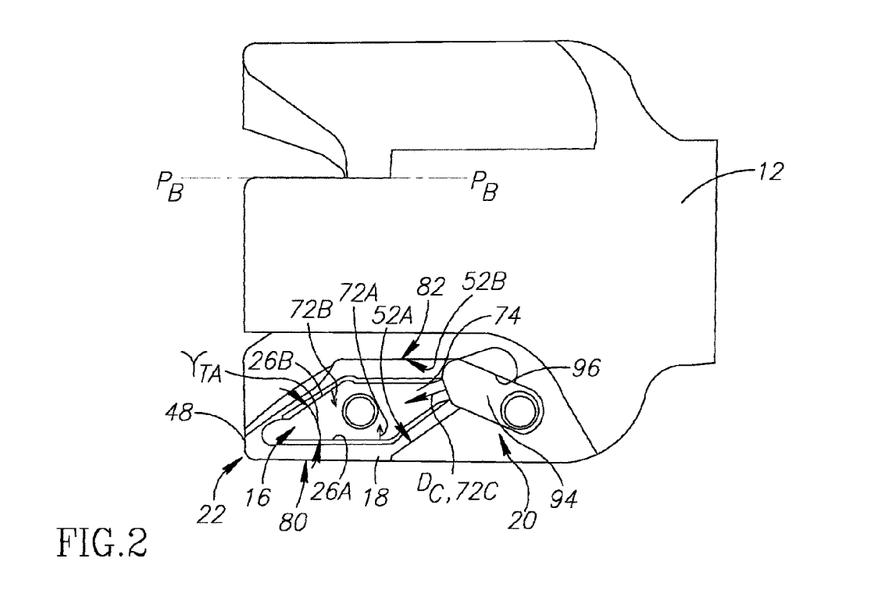
FIG. 2 is a plan view of a tool base surface of the tool assembly in FIGS. 1A to 1D.

Referring also to FIG. 2, the tool 12 can comprise an insert seating region 16 comprising a tool base surface 18, tool inner and peripheral regions 20, 22 located on opposing sides of the insert seating region 16, and a tool anti-slip arrangement 24.

More precisely, the tool anti-slip arrangement 24 can comprise first and second tool abutment surfaces 26A, 26B formed adjacent to the tool base surface 18, and a clamp 28 comprising a tool actuator surface 30.

The clamp 28 can be located at the tool inner region 20. The tool actuator surface 30 can be oriented transverse to the tool base surface 18. More precisely, the tool actuator surface 30 can be oriented perpendicular to the tool base surface 18. Such orientation can assist in preventing bending forces being applied to the clamp 28, which could in turn change the position of the cutting insert 14.

Figure 3A:
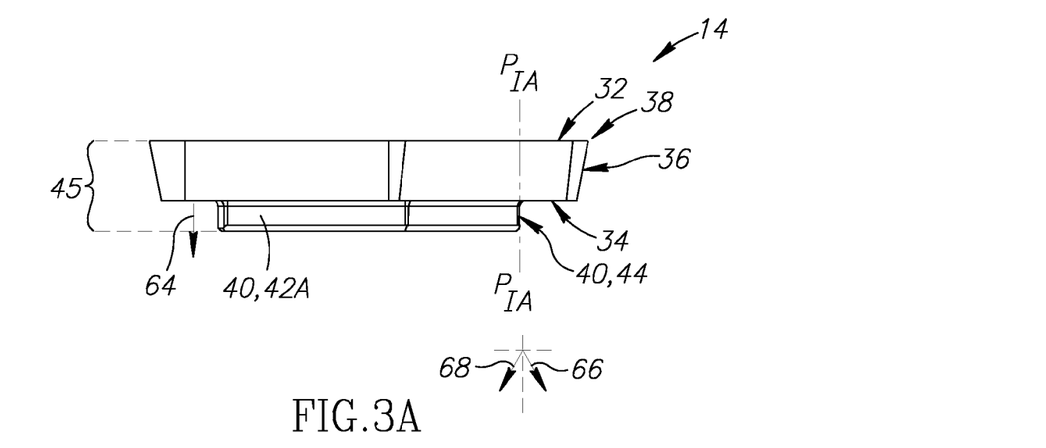
FIG. 3A is a side view of the cutting insert in FIGS. 1A to 1D.
Figure 3B:
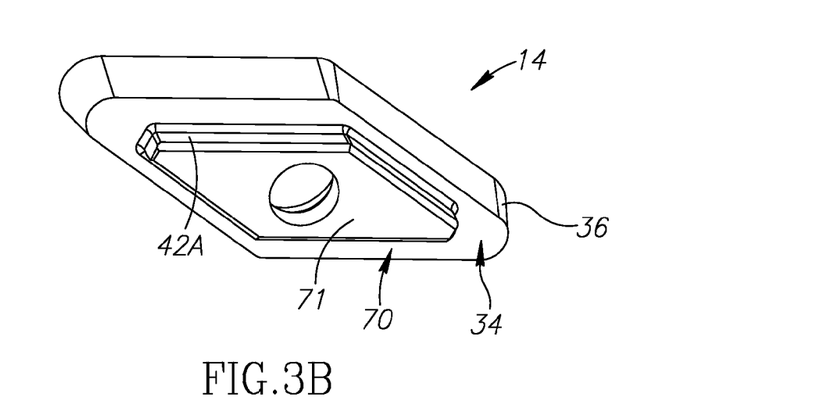
FIG. 3B is a bottom perspective view of a cutting insert in FIG. 3A.
Figure 3C:
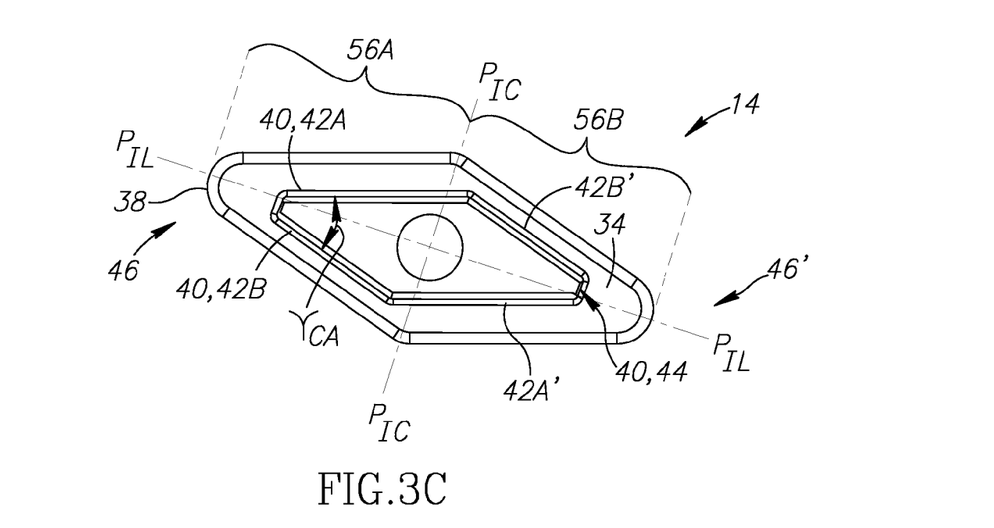
FIG. 3C is a bottom view of the cutting insert in FIGS. 3A and 3B, and could alternatively be considered a plan view of an insert base surface of the cutting insert.

Referring now also to FIGS. 3A to 3C, the cutting insert 14 can comprise opposing insert top and base surfaces 32, 34 which are connected by an insert peripheral surface 36, at least one cutting edge 38, and an insert anti-slip arrangement 40 formed adjacent to the insert base surface 34. More precisely, the insert anti-slip arrangement 40 extends from the insert base surface 34 in a direction away from the insert top surface 32.

The insert anti-slip arrangement 40 can comprise first and second insert abutment surfaces 42A, 42B and an insert actuator surface 44 which is oriented transverse to the insert base surface 34. Thus, the periphery 45 of the cutting insert 14 may be considered to include not only the insert peripheral surface 36, but also the insert actuator surface 44 and first and second insert abutment surfaces 42A, 42B, which are oriented transverse to the insert base surface 34.

The first and second tool abutment surfaces 26A, 26B (FIG. 1D) and first and second insert abutment surfaces 42A, 42B (FIG. 3D) are configured for engaging each other. As best shown in FIGS. 2 and 3C, the abutment surfaces 26A, 26B, 42A, 42B can have corresponding shapes (in this example following straight lines) and orientations and can extend at a cutting insert abutment or tool abutment angle $Y_{CA}$, $Y_{TA}$ of less than 180° to each other. The value in this example is about 40°. In this non-limiting example, each pair of abutment surfaces can respectively form a wedge-shaped arrangement.

To clamp the cutting insert 14 to the tool 12, the cutting insert 14 is mounted on the tool 12 in a position in which the insert base surface 34 contacts the tool base surface 18. Stated differently, the cutting insert 14 can be seated on the tool 12, via the tool and insert base surfaces 18, 34 thereof. Subsequently, the clamp's tool actuator surface 30 can biased against the insert actuator surface 44 resulting in the first and second insert abutment surfaces 42A, 42B being respectively biased against the first and second tool abutment surfaces 26A, 26B. Stated differently, in a clamped position the only contact surfaces of the tool 12 and cutting insert 14 are the tool and insert base surfaces 18, 34, the clamp tool and the insert actuator surfaces 30, 44, and the first and second insert and tool abutment surfaces 42A, 42B, 26A and 26B.

It will be understood that such clamping can be advantageous for preventing slippage of a cutting insert along a tool base surface since a cutting insert can be simultaneously clamped on three surfaces thereof, namely an insert actuator surface, and first and second insert abutment surfaces thereof. It will be understood that in cases of non-parallel abutment surfaces, simultaneous three-point contact can be achieved, the three points (or three surfaces) being located in a non-linear arrangement and hence can constitute a triangular arrangement. In particular, such arrangement of the abutment surfaces and actuator surfaces is suitable for preventing translation and rotation, of a cutting insert relative to a tool, along a base plane $P_B$ (FIGS. 1B and 2) which is parallel with the tool base surface 18 and insert base surface 34.

A further advantage may be possibly achieved by biasing the tool actuator surface 30 in a cutting direction $D_C$ (FIG. 2). It will be understood that a tendency of the cutting insert 14 to slide or be moved out of a desired position, can be greatest at an active first cutting end 46 thereof (FIG. 1C) when it is in contact with a workpiece (not shown). By securing the active first cutting end 46 of the cutting insert, through applying clamping force outward from the tool, maintenance of a precise location of the cutting insert or active first cutting end 46 is achievable.

The cutting direction $D_C$ can be defined as extending from the tool inner region 20 towards the tool peripheral region 22. More precisely, a cutting insert is normally mounted at a peripheral part of a tool, and normally protrudes from the tool to ensure that only the cutting insert, and not the tool contacts a workpiece (not shown). Therefore, such tool peripheral region 22 can be considered as comprising a peripheral edge 48 (FIG. 1D) proximate to a protruding cutting edge 38 of the cutting insert 14, when mounted to the tool 12, or, when the cutting insert 14 is not mounted to the tool 12, the tool peripheral region 22 can be considered as a peripheral edge 48 surrounding the insert seating region 16. Stated alternatively, i.e. in relation to the cutting insert 14, the cutting direction can be considered to extend from a non-cutting end 46' thereof (FIG. 1C) in towards an active first cutting end 46 thereof.

It is noted that the cutting insert 14 and/or the tool 12 can be configured so that the only surfaces of the tool 12 which contact a periphery 45 of the cutting insert 14 are the tool actuator surface 30 and the first and second tool abutment surfaces 26A, 26B. Stated differently, surfaces of the tool which extend upwardly from the tool 12, or, surfaces adjacent the insert peripheral surface 36, such as tool wall surfaces 52A, 52B (FIGS. 1C and 2), are spaced-apart from the cutting insert 14. As such tool wall surfaces do not contact the insert peripheral surface 36, which in this example forms, at an intersection with the top surface 32, the cutting edge 38. The tool 12 can be suitable to hold cutting inserts of different shapes. Stated differently yet, the above-construction can configure a tool for holding different shaped cutting inserts (albeit which have a correspondingly shaped anti-slip arrangement). Accordingly it can be an advantageous for a cutting insert or tool to have spaced-apart anti-slip arrangements and cutting edges or tool wall surfaces, respectively.

Further, more specific exemplary features will now be described.

The cutting edge 38 in this example here extends along the entire intersection of the insert top surface 32 and insert peripheral surface 36. However, in the mounted position shown in FIG. 1C, the active first cutting end 46, in this non-limiting example, comprises only a portion of the edge including first and second lateral cutting edge portions 54A, 54B and an end cutting edge portion 54C extending therebetween.

Figure 1C:
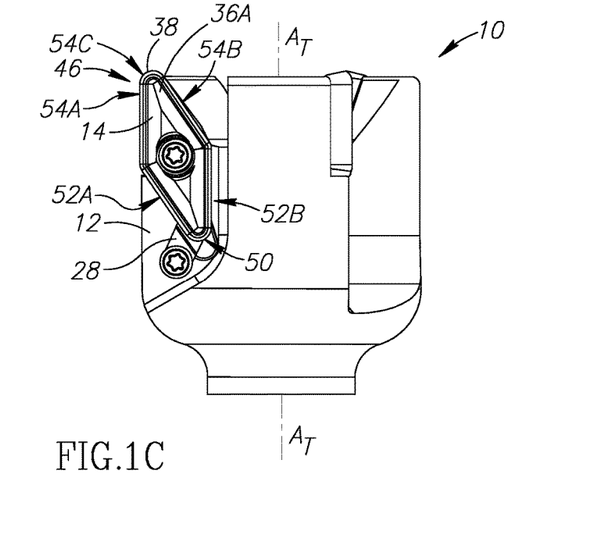
FIG. 1C is a side view of the tool assembly in FIGS. 1A and 1B.

The insert top surface 32, at least a portion thereof (36A; FIG. 1C) adjacent to the active first cutting end 46, can be configured as a rake surface over which chips (not shown) pass, and at least a portion of the insert peripheral surface 36 adjacent thereto can be configured as a relief surface.

Drawing attention to FIG. 3C, the cutting insert 14 can comprise an insert cutting plane $P_{IC}$ which extends perpendicular to the insert base surface 34 and an insert longitudinal plane P. The insert longitudinal plane $P_{IL}$ extends longitudinally through the cutting insert 14, connects opposing first and second cutting ends 46, 46' and is perpendicular to the insert base surface 34. The insert cutting plane $P_{IC}$ theoretically divides the cutting insert 14 into imaginary first and second insert halves 56A, 56B. As shown, the first and second insert abutment surfaces 42A, 42B can be at least partially located at the first insert half 56A and the insert actuator surface 44 can be located at the second insert half 56B. In the present non-limiting example an entirety of the second abutment surface 42B is located at the first insert half 56A.

It will be understood that the insert actuator surface 44 and/or tool actuator surface 30 can be more suitable for stable engagement if at least one, and preferably both, of the two has a blunt shape.

Figure 3D:
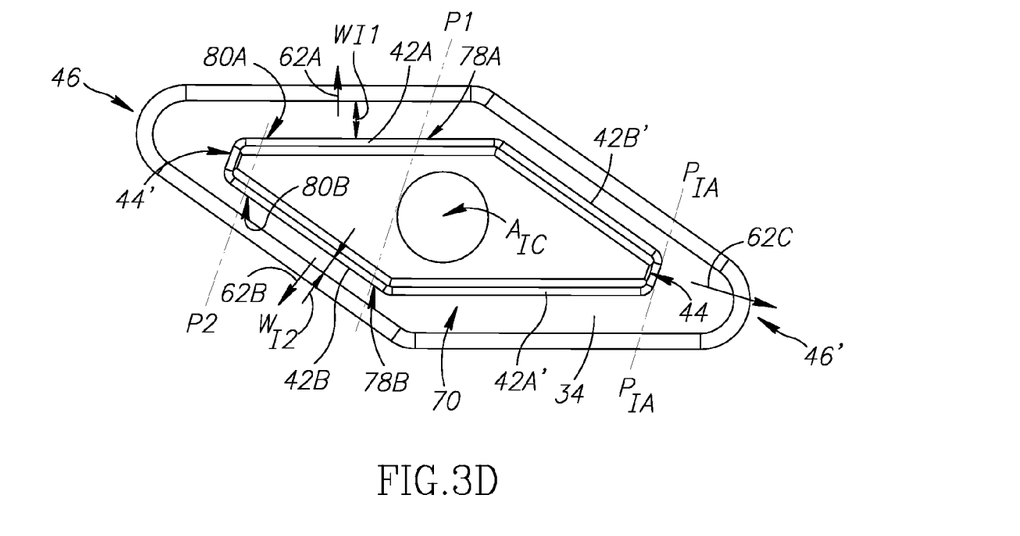
FIG. 3D is an enlarged bottom view of the cutting insert in FIGS. 3A to 3D.

At least when viewing FIG. 3D, i.e. in a non-magnified view, it can be noticed that the insert actuator surface 44 appears flat and hence can lie in an insert actuator plane $P_{IA}$.

The insert actuator plane $P_{IA}$ can be oriented transverse to the insert base surface 34. The insert actuator surface 44 can extend in a direction away from the insert top surface 32, and can follow a straight line. More precisely, the insert actuator plane $P_{IA}$ can be oriented perpendicular to the insert base surface 34.

When the clamp 28 is mounted to the tool 12, the tool actuator surface 30 can extend perpendicular to the tool base surface 18.

Perpendicular orientation of the insert actuator surface 44 and/or the tool actuator surface 30, relative to the insert base surface 34 can assist in avoiding destabilization of the cutting insert 14.

The first and second insert abutment surfaces 42A, 42B and the insert actuator surface 44 constitute a first set of engagement surfaces which are associated with the first cutting end 46.

Figure 3E:
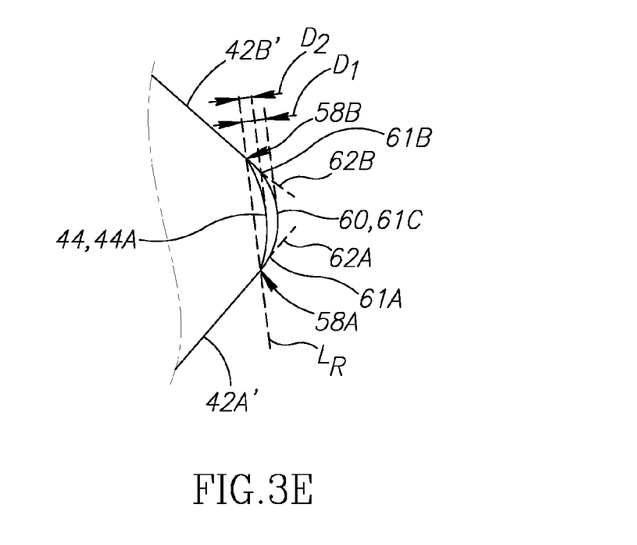
FIG. 3E is a schematic view of an abutment surface, a non-abutment surface and connecting surfaces thereto.

Referring to FIG. 3E, the insert actuator surface 44 of this first set can extend between two other surfaces, which in the present example (showing an indexable insert) can be additional first and second insert abutment surfaces 42A', 42B' belonging to a second, additional set of engagement surfaces and are associated with the second cutting end 46'. The additional first and second insert abutment surfaces 42A', 42B' can comprise end points 58A, 58B which can be connection points with the insert actuator surface 44.

It has been found that when using a blunt actuator surface (i.e. the insert actuator surface 44 and/or the tool actuator surface 30), there can be an advantageous effect of achieving a consistent or controlled force application direction. In other words, a cutting insert can be directed in a precise direction to best achieve a precise, stable mounting arrangement. It will be understood that an actuator surface which is not blunt (i.e. having a small radius of curvature, such as shown by the imaginary line designated by the numeral 60 in FIG. 3E, or a V-shape in a plan view) is likely to be more prone to allowing an applied force to be directed in inconsistent or uncontrolled directions, especially during application of cutting forces on a cutting insert or associated tool.

Notably, while the example insert actuator surface 44 shown in FIG. 3D, appears flat/straight in a plan view from afar, it shows a slight convex curvature if magnified. This is because, surprisingly, it has been found that the most preferred configuration is a very slightly curved, preferably convexly-curved, (e.g. as schematically exemplified in FIG. 3E) insert actuator surface (or, alternatively, a very slightly convexly-curved tool actuator surface), which can allow precise, consistent contact on a single point thereof. It has also been found that the most preferable configuration is one in which the alternate actuator surface (i.e. the actuator surface which is not convexly-curved, which in this example the tool actuator surface 30) is flat (i.e. without curvature).

During development of the subject matter of this application, the most preferred configuration was found to be a slightly convexly curved tool actuator surface 30 (not visible in the unmagnified views shown) together with a flat insert actuator surface 44. However it is still feasible to provide the alternative arrangement (i.e. with the insert actuator surface 44 being curved and the tool actuator surface 30 being flat) or to provide both surfaces with slight curvature. Nonetheless, the most preferable configuration is believed to be one in which the alternate actuator surface (i.e. the actuator surface which is not convexly-curved, in this case the insert actuator surface 44) is flat (i.e. without curvature).

To elaborate, a blunt actuator surface, in this example being the insert actuator surface 44, can be more precisely defined as having a curvature which does not extend along, or is free of, portions which are tangential to the additional first and second insert abutment surfaces 42A', 42B' (or other surfaces connected to the insert actuator surface 44).

Referring only to FIG. 3E, to elaborate further, and for the purpose of comparison only, the imaginary surface 60 is shown which has a smaller radius of curvature than the exemplified, and exaggeratedly curved for the purpose of understanding, insert actuator surface 44. The imaginary surface 60 has portions 61A, 61B between end points 58A, 58B and a middle section thereof, which are tangential to imaginary tangent lines 62A, 62B. The imaginary surface 60 is not considered blunt due to the small radius of curvature thereof. Rather, an actuator surface having a greater curvature, or being flat, and approaching a straight reference line $L_R$ which extends between the end points 58A, 58B is considered blunt. It is reiterated that the insert actuator surface 44 in FIG. 3E is exaggeratedly curved and a more realistic view thereof is shown in FIG. 3D. In summary, it is preferable that at least one of the actuator surfaces 30, 44 of the tool assembly 10 approach or tend towards being flat, without being perfectly flat. It is also preferable, yet not essential, that the alternate actuator surface 30, 44 be flat. Regarding the tendency to flatness, the actuator surface 30, 44 should be flatter than an imaginary surface 60 having a curvature extending along tangent lines. Preferably, such actuator surface 30, 44 should be far flatter than such imaginary surface 60. For example, if an outermost point 61C of the imaginary surface 60 extends a first distance $D_1$ perpendicular to the straight reference line $L_R$, the outermost point 44A of the actuator surface 44 should preferably extend a second distance $D_2$ which is 25% of, or less than, the first distance $D_1$, and, even more preferably, 10% of, or less than, the first distance $D_1$.

While not shown, it will be understood that an actuator surface may still be considered blunt in a case where there is a mere intermediary change of radius at the end points 58A, 58B. This is because the purpose of the bluntness is most relevant at the outermost point 44A, or contact point, or, least a central portion of the actuator surface 44, which is configured to engage another associated actuator surface.

Referring to FIG. 3D the first and second insert abutment surfaces 42A, 42B and the insert actuator surface 44 face outward from the cutting insert 14 (exemplified by outwardly directed arrows designated 62A, 62B and 62C).

As best shown in FIG. 3A, the first and second insert abutment surfaces 42A, 42B and the insert actuator surface 44 can extend in a direction away from the insert top surface 32 (exemplified by a downwardly directed arrow designated as 64).

Referring now to FIG. 3B, in the non-limiting example shown, all of the first and second insert abutment surfaces 42A, 42B, and the insert actuator surface 44 are formed on a single protuberance 70 which has a non-contacting lower protuberance surface 71 (FIG. 3B). The insert actuator surface 44 and the first and second insert abutment surfaces 42A, 42B can be formed on a single protuberance 70 which itself may be formed in a central area of the insert base surface 34 and spaced apart on all sides from the insert peripheral surface 36 by the insert base surface 34.

The exemplary cutting insert 14 shown is indexable, and can have 180° rotational symmetry around an insert central axis $A_{IC}$ (FIG. 3D) extending perpendicular to, and through the center of, the insert base surface 34. Accordingly, the cutting insert 14 can be configured with a second insert anti-slip arrangement 40'. The second insert anti-slip arrangement 40' can comprise the additional first and second insert abutment surfaces 42A', 42B' mentioned above, and an additional insert actuator surface 44'.

As shown, the surfaces 42A, 42B, 44, 42A', 42B', 44' of the first and second insert anti-slip arrangements 40, 40' form all sides of or enclose the single protuberance 70. Thus, the single protuberance 70 of the non-limiting example cutting insert 14 shown, can be considered to have two sets of engagement surfaces, a first set including surfaces 42A, 42B and 44 and a second set including surfaces 42A', 42B' and 44'.

Referring now to the surfaces of the tool anti-slip arrangement 24, as shown in FIG. 2, it will be understood that they can have corresponding features to the insert anti-slip arrangement 40, mutatis mutandis.

Additionally, the first and second tool abutment surfaces 26A, 26B and the tool actuator surface 30 can face inwardly (i.e., toward the center of the insert seating region 16, as exemplified by inwardly directed arrows designated 72A, 72B and 72C).

The first and second tool abutment surfaces 26A, 26B and the tool actuator surface 30 can be recessed into the insert seating region 16. Stated differently, the first and second tool abutment surfaces 26A, 26B and the tool actuator surface 30 can be side surfaces of a recess 74 formed in the insert seating region 16.

Figure 4A:
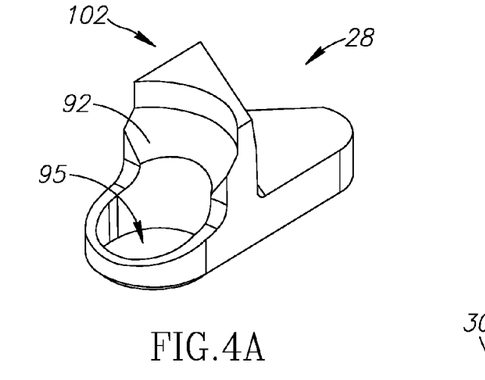
FIG. 4A is a top perspective view of a clamp in FIGS. 1A to 1D.
Figure 4B:
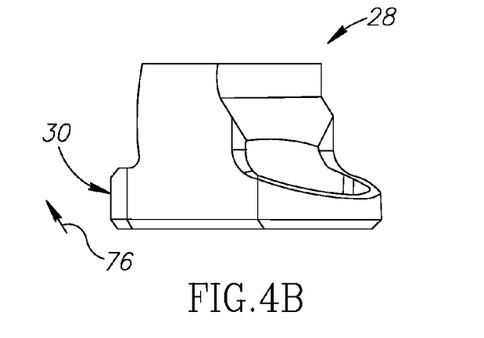
FIG. 4B is a side view of the clamp in FIG. 4A.
Figure 4C:
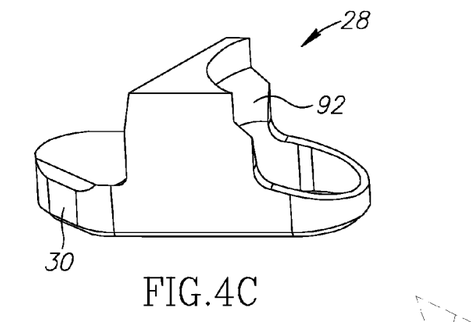
FIG. 4C is a perspective side view of the clamp in FIGS. 4A and 4B.

While the exemplary tool actuator surface 30 and the first and second tool abutment surfaces 26A, 26B shown are perpendicular to the tool base surface 18, they could also be at least partially slanted in a upward-inward direction (for example, as shown in FIG. 4B, the tool actuator surface 30 could be slanted in the upward-inward direction shown by the arrow designated as 76. Similarly, while the exemplary insert actuator surface 44 and the first and second insert abutment surfaces 42A, 42B shown are perpendicular to the insert base surface 34, they could also be at least partially slanted in a downward-outward direction (for example the insert actuator surface 44 could be slanted in the downward-outward direction shown by the arrow designated as 66; for comparison, the arrow designated as 68 is directed a downward-inward direction).

Referring to FIG. 3D, it will be understood that there can be insert abutment surface planes, for example first and second insert abutment surface planes $P_1$, $P_2$, each of which are parallel to the insert actuator surface plane $P_{I4}$. It is noted that the first insert abutment surface plane $P_1$ is closer to the insert actuator surface plane $P_{I4}$ and that a pair of points 78A, 78B of the first and second insert abutment surfaces 42A, 42B which lie on the first insert abutment surface plane $P_1$ are spaced apart from each other a greater magnitude of distance than a pair of points 80A, 80B which lie on the second insert abutment surface plane $P_2$. Thus, again with reference to FIG. 3D, the first and second insert abutment surfaces 42A, 42B belonging to the first set of engagement surfaces converge in a direction toward the additional insert actuator surface 44' belonging to the second set of engagement surfaces and also toward the associated first cutting end 46. Similarly, the additional first and second insert abutment surfaces 42A', 42B' belonging to the second set of engagement surfaces converge in a direction toward the insert actuator surface 44 belonging to the first set of engagement surfaces and also toward the associated second cutting end 46'.

Figure 5A:
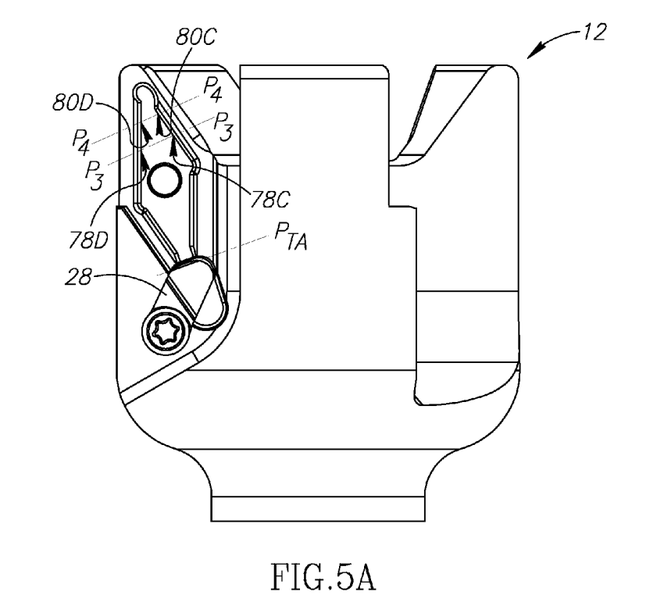
FIG. 5A corresponds to the view in FIG. 2 except further comprising a screw and clamp of the tool assembly in FIGS. 1A to 1D.

The construction above can also be possible for the tool anti-slip arrangement 24, mutatis mutandis (For example see FIG. 5A, wherein the tool actuator surface plane $P_{T4}$ corresponds to the insert actuator surface plane $P_{I4}$; first and second tool abutment surface planes $P_3$ and $P_4$ correspond to first and second insert abutment surface planes $P_1$, $P_2$; points 78C, 78D correspond to points 78A, 78B; and points 80C, 80D correspond to points 80A, 80B). Accordingly, tool abutment surfaces 26A, 26B converge as they tend toward the tool peripheral region 22.

Referring to FIGS. 3A and 3B, the protuberance 70 on which the insert first and second abutment surfaces 42A, 42B are formed can be entirely spaced apart from the insert peripheral surface 36. Stated differently, the insert base surface 34 can extend continuously along the entire insert peripheral surface 36 and can completely surround the insert first and second abutment surfaces 42A, 42B and the insert actuator surface 44. The base surface 34 can be flat.

It will be understood that any of the above features, e.g. a continuous insert base surface 34, a base surface which extends along a periphery of a cutting insert, a flat base surface, etc., can provide stable mounting of a cutting insert on a tool.

Any of the above constructional features can also be possible for the tool base surface 18, mutatis mutandis. However, the tool base surface 18 can, for example, extend along the entire insert peripheral surface except for a portion completed by the clamp 28. Notably, the tool base surface 18 connects the first and second tool abutment surfaces 26A, 26B, i.e. providing a continuous wall from the first abutment surface 26A to the second abutments surface 26B. Such connection can provide additional constructional strength against deflection of the first and second tool abutment surfaces 26A, 26B during a cutting operation (particularly notable at high speeds).

Figure 1D:
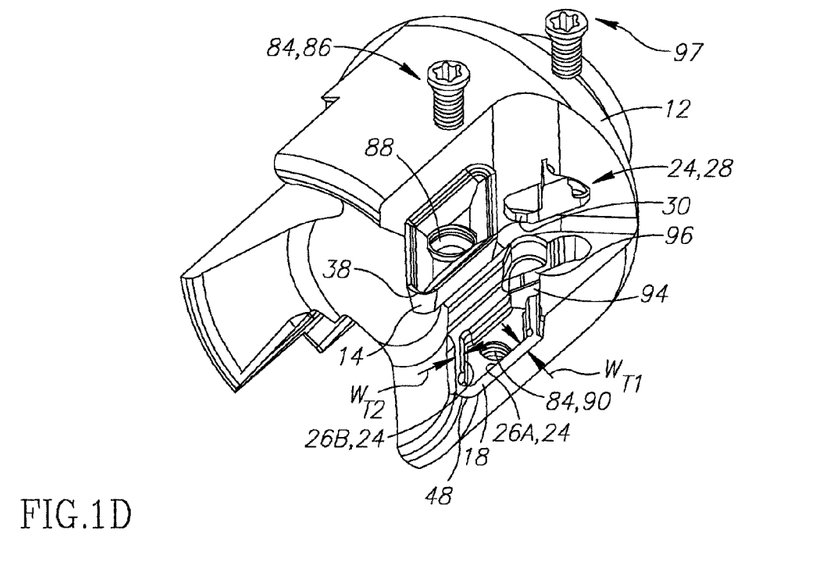
FIG. 1D is an exploded view of the tool assembly in FIGS. 1A to 1C.

Referring to FIGS. 1D and 2, a first portion 80 of the tool base surface 18 adjacent to the first tool abutment surface 26A has less material thereunder than a second portion 82 of the tool base surface 18 which is closer to the tool axis $A_T$ (FIG. 1C). In such cases, it has been found that forming the first portion 80 of the tool base surface 18 to be larger than the second portion 82 of the tool base surface 18 can possibly provide advantageous constructional strength, especially in such cylindrical tools.

Such enlargement can be achieved by widening the first portion 80. For example, a first tool base width $W_{T1}$ of the first portion 80 of the tool base surface 18 which extends from, and perpendicular to, the first tool abutment surface 26A, can be greater than a second tool base width $W_{T2}$ which extends from, and perpendicular to, the second tool abutment surface 26B.

The insert base surface 34 can be configured to correspond to the tool base surface 18. For example, referring to FIG. 3D, a first insert base width $W_{I1}$ of the insert base surface 34 which extends from, and perpendicular to, the first insert abutment surface 42A, can be greater than a second insert base width $W_{I2}$ which extends from, and perpendicular to, the second insert abutment surface 42B.

While it will be understood that a cutting insert can be clamped to a tool in various ways, the following is an exemplary clamping arrangement.

The tool and insert base surfaces 18, 34 can be clamped against each other by a biasing arrangement 84 (FIG. 1D). This biasing arrangement 84 or a different one, can, in any case, be configured to prevent movement of a cutting insert in a direction away from a tool base surface.

The biasing arrangement 84 can comprise a biasing arrangement screw 86 configured to extend through a through hole 88 of the cutting insert 14, and a threaded bore 90 formed in the tool 12 to which the biasing arrangement screw 86 is securable.

Drawing attention to FIGS. 1D, and 4A to 4D, the clamp 28 can be configured to receive a clamp screw 97 via a clamp bore 95 (FIG. 4D) formed in the clamp 28.

Figure 4D:
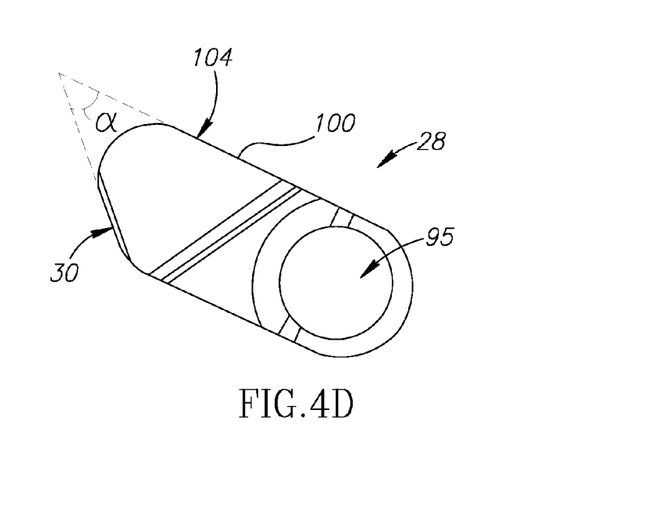
FIG. 4D is a plan view of the clamp in FIGS. 4A to 4C.

More precisely, the clamp 28 can comprise a slanted clamp surface 92 located between the tool actuator surface 30 and the clamp bore which is comprised to be abutted by the clamp screw 97.

The slanted clamp surface 92 can be formed on an upwardly projecting clamp projection 102 (i.e. projecting upwardly from the remainder of the substantially planar shaped clamp 28).

While a clamp could conceivably comprise a bendable portion which could cause a change of position, or orientation, of a tool actuator surface, the non-limiting example shown is one where the entire clamp 28 is movable upon engagement by the clamp screw 97.

It will be understood that the biasing arrangement 84, or a different arrangement, can be configured to allow slippage of the cutting insert 14 along the tool base surface 18, as the biasing arrangement screw 86 will normally allow limited slippage along the base plane $P_B$.

Consequently, clamping of the cutting insert 14 to the tool 12 can comprise sliding motion of the cutting insert's insert base surface 34 along the tool base surface 18.

Notably, the tool actuator surface 30 is formed at the end of an elongated and plate-shaped clamp protrusion 104. The clamp projection 104 extends from the upwardly projecting clamp projection 102 to the tool actuator surface 30. The elongated shape allows the tool actuator surface 30 to reach the insert actuator surface 44.

It has been found that wedging at least a portion of a clamp between an insert and a tool wall can provide a stable clamping arrangement.

Figures 5B, 5C:
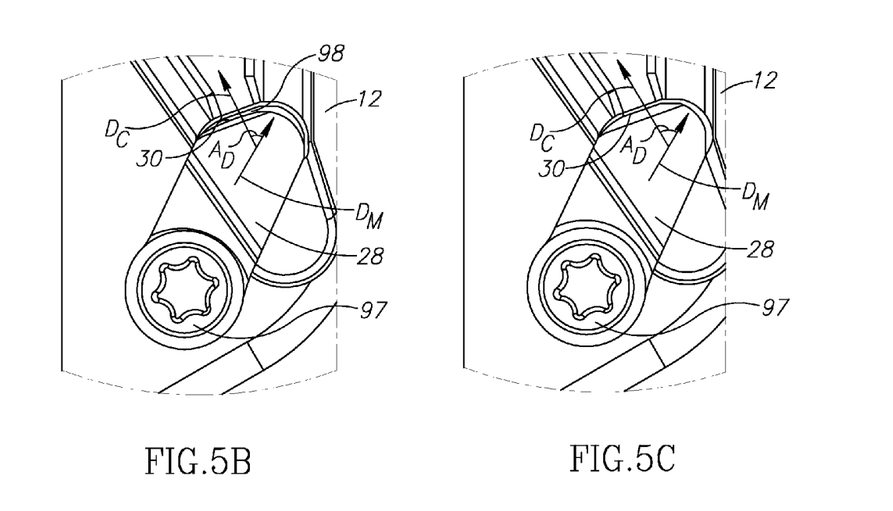
FIG. 5B is an enlarged view of a portion of the tool, screw and clamp in FIG. 5A.
FIG. 5C is an enlarged view of a portion of the tool, screw and clamp in FIG. 5A, with the clamp located in a different position to FIGS. 5A and 5B.

For example, referring to FIGS. 5A to 5C, the clamp 28 can be moved a motion direction $D_M$ which is transverse to the cutting direction $D_C$. FIG. 5B shows a first position wherein there is a gap 98 between the tool actuator surface 30 and insert actuator surface 44, and FIG. 5C shows a position at which contact of the tool actuator surface 30 and insert actuator surface 44 would occur.

As shown best in FIG. 2, the tool 12 can be formed with a track 94 bounded by an inner wall 96. Said wedging can occur between the insert actuator surface 44 and the inner wall 96.

An internal direction angle $A_D$ formed between the cutting direction $D_C$ and the motion direction $D_M$ can be an acute angle. Preferably, the direction angle $A_D$ can be between 30° and 80°.

Referring to FIG. 4D, an internal clamp angle α of a clamp wall surface 100 with the tool actuator surface 30 (or at least extensions thereof) can be an acute. The clamp angle α can fulfill the condition 30°<α<80°.

The description above includes one or more exemplary embodiments and details for enablement, if needed, of claimed subject matter, and does not exclude non-exemplified embodiments and details from the claim scope of the present application.

The invention claimed is:

1. A tool having a cutting direction and comprising: an insert seating region comprising a tool base surface, tool inner and peripheral regions located on opposing sides of the insert seating region, the cutting direction being defined as extending from the tool inner region towards the tool peripheral region, and a tool anti-slip arrangement;
the tool anti-slip arrangement comprising first and second tool abutment surfaces formed adjacent to the tool base surface and being non-parallel to each other and to the tool base surface, and a clamp located at the tool inner region and comprising a tool actuator surface lying in a tool actuator surface plane which is oriented transverse to the tool base surface;
wherein pairs of closest points of the first and second tool abutment surfaces that lie within respective common tool abutment surface planes which are parallel to the tool actuator surface plane, are a predetermined distance apart;
at least one of the predetermined distances has a greater magnitude than another predetermined distance which is associated with a pair of points further spaced from the tool actuator surface plane; and
the clamp is configured for force application in the cutting direction via the tool actuator surface.

2. The tool according to claim 1, wherein the tool provides a continuous wall from the first abutment surface to the second abutments surface.

3. The tool according to claim 1, wherein the force application is in a direction parallel to the tool base surface.

4. The tool according to claim 1, wherein the tool is configured for linear motion of the clamp in a plane parallel to the tool base surface.

5. The tool according to claim 4, wherein the linear motion of the clamp is in a direction transverse to the cutting direction.

6. The tool according to claim 1, wherein the tool is formed with a track which is bounded by an inner wall of the tool, the track and clamp being configured for continuous contact of the inner wall and clamp at each position thereof.

7. The tool according to claim 1, wherein each pairs of points of the first and second tool abutment surfaces which are closer to the tool actuator surface plane than another pair of points of the first and second tool abutment surfaces, have a predetermined distance of greater magnitude than the latter pair of points.

8. The tool according to claim 1, wherein the clamp is substantially planar shaped, except for an upwardly projecting clamp projection thereof.

9. The tool according to claim 1, wherein a first tool base width of the tool base surface which extends from, and perpendicular to, the first tool abutment surface, is greater than a second tool base width which extends from, and perpendicular to, the second tool abutment surface.

10. The tool according to claim 1, wherein the first and second tool abutment surfaces are formed in a single tool recess.

11. The tool according to claim 1, in combination with a cutting insert, wherein:
the cutting insert is mounted in the insert seating region; and
the cutting insert is clamped by the clamp.

12. The tool according to claim 11, wherein:
the cutting insert comprises opposing insert top and base surfaces which are connected by an insert peripheral surface, at least one cutting edge, and an insert anti-slip arrangement formed adjacent to the insert base surface;
the insert anti-slip arrangement comprises first and second insert abutment surfaces which are non-parallel to each other and to the insert base surface, and an insert actuator surface which is oriented transverse to the insert base surface;
the insert base surface contacts the tool base surface; and
the clamp biases the tool actuator surface against the insert actuator surface to thereby bias the first and second insert abutment surfaces against the first and second tool abutment surfaces for preventing slippage of the cutting insert along the tool base surface.

13. The tool according to claim 12, wherein:
the tool anti-slip arrangement and the insert anti-slip arrangement are configured to prevent motion of the cutting insert in a plane parallel with the tool base surface.

14. The tool according to claim 12, wherein:
the only surfaces of the tool which contact a periphery of the cutting insert are the tool actuator surface and the first and second tool abutment surfaces.

15. The tool according to claim 12, wherein:
the only surfaces of the tool which contact the cutting insert are the tool actuator surface, the tool base surface and the first and second tool abutment surfaces.

16. The tool according to claim 12, wherein:
the tool actuator surface and the insert actuator surface are both blunt.

17. The tool according to claim 16, wherein:
one of the tool actuator surface and the insert actuator surfaces is flat, and the other is curved.

18. The tool according to claim 17, wherein:
the tool actuator surface is curved and the insert actuator surface is flat.

19. The tool according to claim 12, wherein:
in a bottom view of the cutting insert, each of the first and second insert abutment surfaces and the insert actuator surface face outward from the insert.

20. The tool according to claim 12, wherein:
the insert actuator surface and/or the first and second insert abutment surfaces of the cutting insert are perpendicular to the insert base surface.

21. The tool according to claim 12, wherein:
the insert actuator surface and/or the first and second insert abutment surfaces of the cutting insert are at least partially slanted in a downward-outward direction.

22. The tool according to claim 12, wherein:
the insert actuator surface and the first and second insert abutment surfaces are formed on a single protuberance.

23. The tool according to claim 12, wherein:
the insert base surface extends along the entire insert peripheral surface.

* * * * *